US 7,163,612 B2

(12) United States Patent
Sterling et al.

(10) Patent No.: US 7,163,612 B2
(45) Date of Patent: Jan. 16, 2007

(54) METHOD, APPARATUS AND ARTICLE FOR MICROFLUIDIC CONTROL VIA ELECTROWETTING, FOR CHEMICAL, BIOCHEMICAL AND BIOLOGICAL ASSAYS AND THE LIKE

(75) Inventors: James D. Sterling, Upland, CA (US); Chao-Yi Chen, Taipei (TW)

(73) Assignee: Keck Graduate Institute, Claremont, CA (US)

( * ) Notice: Subject to any disclaimer, the term of this patent is extended or adjusted under 35 U.S.C. 154(b) by 301 days.

(21) Appl. No.: 10/305,429

(22) Filed: Nov. 26, 2002

(65) Prior Publication Data
US 2003/0164295 A1    Sep. 4, 2003

Related U.S. Application Data

(60) Provisional application No. 60/333,621, filed on Nov. 26, 2001.

(51) Int. Cl.
*G01N 27/26* (2006.01)
(52) U.S. Cl. .................. 204/600; 204/643; 422/100
(58) Field of Classification Search ........ 204/600–604, 204/643–645, 672; 422/82.01, 100; 436/149–150
See application file for complete search history.

(56) References Cited

U.S. PATENT DOCUMENTS

| 4,583,824 A | 4/1986 | Lea .................. 350/267 |
|---|---|---|
| 5,194,862 A | 3/1993 | Edwards ................ 341/20 |
| 5,495,077 A | 2/1996 | Miller et al. ............ 178/18 |
| 5,632,876 A | 5/1997 | Zanzucchi et al. ........ 204/600 |
| 5,750,015 A | 5/1998 | Soane et al. ............ 204/454 |
| 5,858,188 A | 1/1999 | Soane et al. ............ 204/454 |
| 6,007,690 A | 12/1999 | Nelson et al. ............ 204/601 |
| 6,136,212 A | 10/2000 | Mastrangelo et al. ....... 216/49 |
| 6,203,981 B1 * | 3/2001 | Ackley et al. ............. 435/6 |
| 6,258,606 B1 * | 7/2001 | Kovacs .................. 436/149 |
| 6,294,063 B1 | 9/2001 | Becker et al. ............ 204/450 |
| 6,318,970 B1 | 11/2001 | Backhouse ............. 417/92 |
| 6,369,954 B1 | 4/2002 | Berge et al. ............ 359/666 |
| 6,449,081 B1 | 9/2002 | Onuki et al. ............ 359/245 |
| 6,454,924 B1 | 9/2002 | Jedrzejewski et al. ...... 204/601 |
| 6,473,492 B1 | 10/2002 | Prins et al. ............. 378/158 |

(Continued)

FOREIGN PATENT DOCUMENTS

WO     WO 00/69565      11/2000

(Continued)

OTHER PUBLICATIONS

Washizu, M., "Electrostatic Actuation of Liquid Droplets for Microreactor Applications," Jul./Aug. 1998, IEEE Transactions on Industry Applications, vol. 34, No. 4, pp. 732-737.*

(Continued)

*Primary Examiner*—Kaj K. Olsen
(74) *Attorney, Agent, or Firm*—Seed IP Law Group PLLC

(57) ABSTRACT

An active matrix microfluidic platform employs thin film transistor active ("TFT") matrix liquid crystal display technology to manipulate small samples of fluid for chemical, biochemical, or biological assays without moving parts, for example, using a two-dimensional matrix array of drive electrodes. The active matrix microfluidic platform may employ existing active matrix addressing schemes and/or commercial "off-the-shelf" animation software to program assay protocols. A feedback subsystem may determine an actual location of a fluid in the microfluidic structure, and provides location information to for display, for example, on an active matrix display, and/or to control movement of one or more fluid bodies in the microfluidic structure.

19 Claims, 16 Drawing Sheets

U.S. PATENT DOCUMENTS

| | | | |
|---|---|---|---|
| 6,565,727 B1* | 5/2003 | Shenderov | 204/600 |
| 6,733,645 B1* | 5/2004 | Chow | 204/453 |
| 2001/0026935 A1 | 10/2001 | Ackley et al. | 435/286.1 |
| 2002/0043463 A1 | 4/2002 | Shenderov | 204/450 |
| 2004/0055536 A1 | 3/2004 | Kolar et al. | 118/626 |
| 2004/0055891 A1 | 3/2004 | Pamula et al. | 205/98 |
| 2004/0058450 A1 | 3/2004 | Pamula et al. | 436/150 |

FOREIGN PATENT DOCUMENTS

| | | |
|---|---|---|
| WO | WO 02/07503 A1 | 1/2002 |

OTHER PUBLICATIONS

Beni, G. et al., "Dynamics of Electrowetting Displays," *J. Appl. Phys.* 52 (10):6011-6015, Oct. 1981.

Cho, S. et al., "Splitting a Liquid Droplet for Electrowetting-Based Microfluidics," in *Proceedings of the 2001 ASME Int'l Mech. Engineering Congress and Exposition*, New York, NY, Nov. 11-16, 2001, pp. 1-7.

Cho, S. et al., "Towards Digital Microfluidic Circuits: Creating, Transporting, Cutting and Merging Liquid Droplets by Electrowetting-Based Actuation," *IEEE*, pp. 32-35, 2002.

Lee, J. et al., "Surface-Tension-Driven Microactuation Based on Continuous Electrowetting," *J. of Microelectromechanical Systems* 9 (2):171-180, Jun. 2000.

Lee, J. et al., "Addressable Micro Liquid Handling by Electric Control of Surface Tension," in *Proceedings of the IEEE Int'l Micro Electro Mechanical Systems Conference*, New York, NY, Jan. 21-25, 2001, pp. 499-502.

Moon, H. et al., "Low Voltage Electrowetting-On-Dielectric," *J. of Appl. Phys.* 92(7):4080-4087, Oct. 2002.

Pollack M. et al., "Electrowetting-Based Actuation of Liquid Droplets for Microfluidic Applications," *Appl. Phys. Letters* 77 (11):1725-1726, Sep. 2000.

Quilliet, C. et al., "Electrowetting: A Recent Outbreak," *Curr. Opin. in Colloid & Interface Science* 6 :34-39, 2001.

Vallet, M. et al., "Limit Phenomena for the Spreading of Water on Polymer Films by Electrowetting," *Eur. Phys. J. B.* 11:583-591, 1999.

Vallet, M. et al., "Electrowetting of Water and Aqueous Solutions on Poly(Ethylene Terephthalate) Insulating Films," *Polymer* 37(12):2465-2470, 1996.

Chigrinoz, V., *Liquid Crystal Devices: Physics and Applications*, 1999, Chapter 3, "Liquid Crystal Displays", pp. 215-286.

Lueder, E., *Liquid Crystal Displays, Addressing Schemes and Electro-Optical Effects*, John Wiley & Sons, 2001, Chapter 10, "Addressing Schemes for Liquid Crystal Displays", pp. 161-163 and Chapter 14, "Addressing of Liquid Crystal Displays with a-Si Thin Film Transistors (a-Si-TFTs)",210-248.

Yeh, P. et al., *Optics of Liquid Crystal Displays*, John Wiley & Sons, 1999, Chapter 6, "Matrix Addressing, Colors, and Properties of LCDs", pp. 248-267.

Pollack, M. et al., "Electrowetting-Based Actuation of Droplets for Integrated Microfluidics," *Lab on a Chip* 2:96-101, 2002.

Hayes, R. et al., "Video-Speed Electronic Paper Based on Electrowetting," *Nature* 425:383-385, Sep. 25, 2003.

* cited by examiner

METHOD, APPARATUS AND ARTICLE FOR MICROFLUIDIC CONTROL VIA ELECTROWETTING, FOR CHEMICAL, BIOCHEMICAL AND BIOLOGICAL ASSAYS AND THE LIKE

This applicant claims benefit to provisional application No. 60/333,621, filed on Nov. 26, 2001.

BACKGROUND OF THE INVENTION

1. Field of the Invention

This disclosure is generally related to the manipulation of fluids, for example, manipulating fluids for performing chemical, biochemical, cellular and/or biological assays, and more particularly to electrowetting to manipulate electrolytic fluids, for example reactants such as agents and reagents.

2. Description of the Related Art

Two of the primary factors currently driving the development of microfluidic chips for pharmaceuticals, the applied life sciences, and medical diagnostics include: (1) the reduction of sample volumes to conserve expensive reagents and reduce disposal problems; and (2) the reduction of test turnaround times to obtain laboratory results. Through the engineering of new processes and devices, time-consuming preparatory procedures and protocols can be automated and/or eliminated. This has been the motivation behind the development of microfluidics associated with lab-on-a-chip systems, biochips, and micro Total Analytical Systems (μTAS). The result has been a large number of mechanical designs for pumps, valves, splitters, mixers, and reactors that have been micro-fabricated in channels using photolithographic and other bonding and assembly methods.

There is also a growing need in the fields of chemistry, biochemistry and biology for performing large scale, combinatorial testing. One type of large-scale combinatorial testing employs microarrays. Each microarray consists of hundreds or thousands of spots of liquid applied to a slide or "biochip." Each spot may, for example, contain a particular DNA segment. The microarrays are created using robots which move pins to wick up the appropriate fluid from reservoirs and to place each individual spot of fluid precisely on the slide. The hardware is expensive and the slides are time consuming to manufacture.

BRIEF SUMMARY OF THE INVENTION

Under one aspect, an active matrix microfluidic platform employs thin film transistor active ("TFT") matrix liquid crystal display technology to manipulate small samples of fluid for chemical, biochemical, or biological assays without moving parts, for example using a two-dimensional matrix array of drive electrodes.

In another aspect, the active matrix microfluidic platform may employ existing active matrix addressing schemes and/or commercial "off-the-shelf" animation software to program assay protocols.

In a further aspect, a feedback subsystem determines an actual location of a fluid in the microfluidic structure, and provides location information for display, for example on an active matrix display, and/or to control movement of one or more fluid bodies in the microfluidic structure.

The active matrix microfluidic platform may provide a low cost and efficient method and apparatus for the pharmaceutical industries to perform drug-screening applications. The active matrix microfluidic platform may also provide a low cost and efficient method and apparatus for the chemical industries to perform combinatorial chemistry applications. The active matrix microfluidic platform may additionally provide a low cost and efficient method and apparatus for the bioscience industries to perform gene expression microarray research. The active matrix microfluidic platform may further provide a low cost and efficient method and apparatus for clinical diagnostic bioassay, as well as lead to additional "lab-on-a-chip" applications.

In a further aspect, a microfluidic system comprises a substrate; an array of drive electrodes carried by the substrate; a dielectric carried by the substrate, overlying at least a portion of the array of drive electrodes; a fluid compatibility layer overlying the array of drive electrodes; and at least one ground line carried by the substrate, overlying at least a portion of the dielectric to provide a ground potential to at least one fluidic body.

In an even further aspect, a method of forming a microfluidic structure for manipulating at least one fluid body comprises providing a first plate; forming an array of drive electrodes overlying at least a portion of the first plate, the drive electrodes having a dimension less than a lateral dimension of the at least one fluid body; forming a fluid compatibility layer overlying the array of drive electrodes; and forming at least one ground line carried by the substrate and positioned to provide a ground potential to the at least one fluid body.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with matrix arrays such as those used in active matrix displays, thin film transistors, voltage sources, controllers such as microprocessors and/or computing systems, photolithography, micro-fabrication, and animation software have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope of meaning of the claimed invention.

Figure 1:
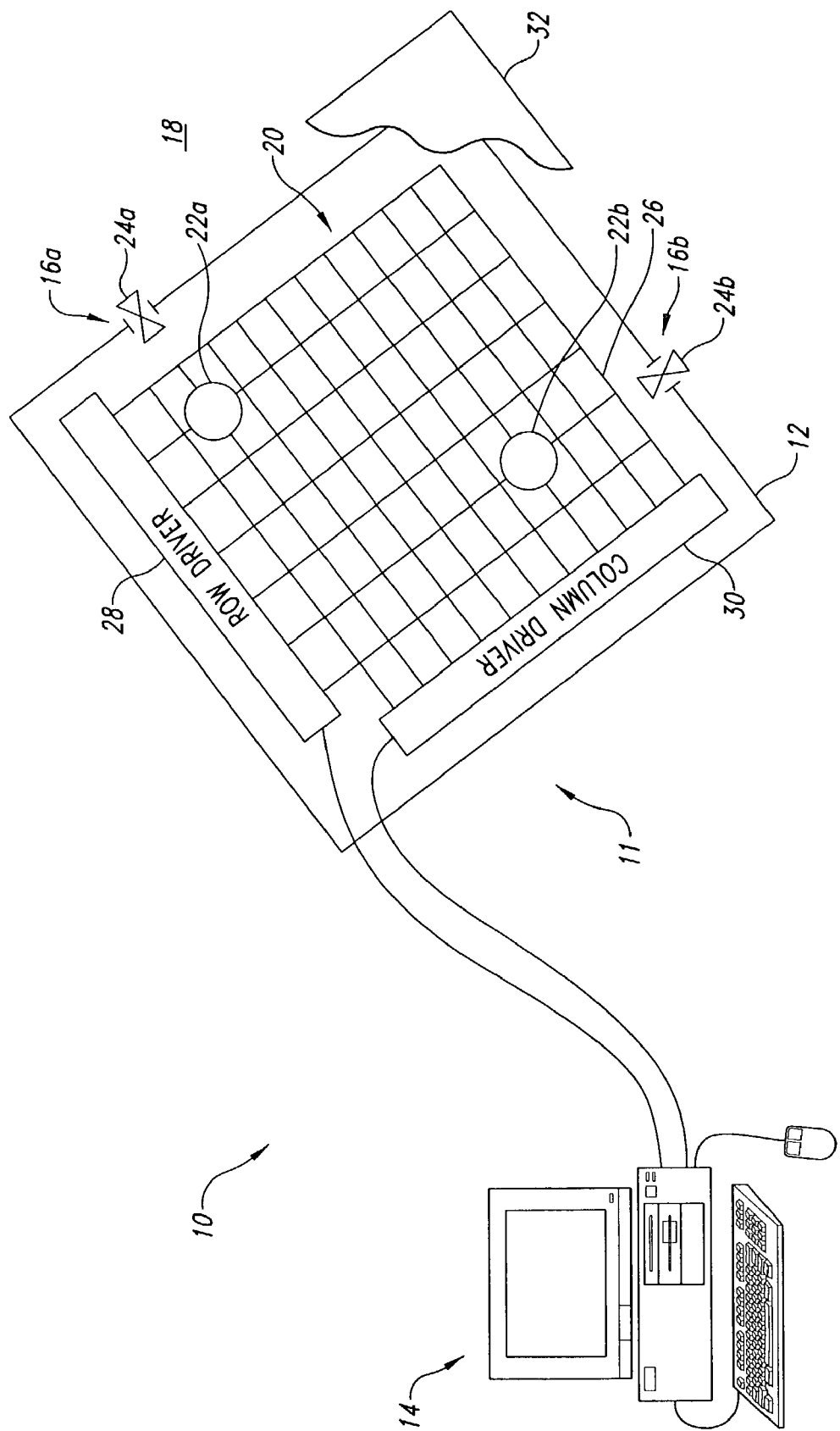
FIG. 1 is a schematic diagram of a microfluidic control system, including a controller in the form of a computing system, and a microfluidic platform having a microfluidic structure including a two-dimensional matrix array of drive electrodes, row and column driving circuits and a ground electrode.

FIG. 1 shows a microfluidic system 10 having a microfluidic platform 11 including a microfluidic structure 12 and a controller such as a computing system 14 coupled to control the microfluidic structure 12. The microfluidic structure 12 includes at least one port 16a for providing fluid communication between an exterior 18 and an interior 20 of the microfluidic structure 12. The port 16a permits the addition and/or removal of one or more fluids 22a, 22b to the interior 20 of the microfluidic structure 12 after manufacture and during use of the microfluidic structure 12. In some embodiments, the microfluidic structure 12 includes a separate inflow port 16a and outflow port 16b. The microfluidic structure 12 may further include one or more valves 24a, 24b for controlling the flow of fluids through the respective ports 16a, 16b.

The microfluidic structure 12 includes an array of drive electrodes 26. In one embodiment illustrated in FIG. 1, the array of drive electrodes 26 takes the form of a two-dimensional matrix array. The two-dimensional matrix of drive electrodes 26 allows movement of the fluids via electrowetting in any direction on the microfluidic structure 12, without dedicated hardware defined flow paths. This provides significantly increased flexibility in use over microfluidic structures 12 having hardware defined flow paths, and may be less costly to manufacture since it allows the use of well-developed techniques from the field of active matrix display fabrication and control. In another embodiment, the array of drive electrodes 26 describes specific hardware defined flow paths, such that the fluids 22a, 22b can only move along the prescribed flow paths. As discussed above, microfluidic structures 12 employing hardware defined flow paths may not be as advantageous as those employing two-dimensional matrix arrays of drive electrodes 26 but may realize other advantages such as maintaining sample purity and/or avoiding sample evaporation.

The microfluidic structure 12 may also include a row driving circuit 28 and a column driving circuit 30 to drive the drive electrodes 26. In the embodiment illustrated in FIG. 1, the row and column driving circuits 28, 30 are formed "on chip," as part of the microfluidic structure 12, while in alternative embodiments the row and column driving circuits 28, 30 are located off of the chip, for example, as a portion of an off chip controller such as the computing system 14 or discrete drive controller (not illustrated).

In some embodiments, the microfluidic structure 12 may further include one or more ground electrodes 32, spaced perpendicularly from the array of drive electrodes 26. The ground electrode 32 provides a ground potential to the body of fluid 22a, 22b.

The microfluidic structure 12 may take advantage of well-developed technologies associated with the visual display of information and, in particular, the thin film transistor ("TFT") active matrix liquid crystal displays ("LCD") that have come to dominate the flat panel display market. For example, existing electrode (i.e., pixel) addressing schemes, frame times, frame periods, display formats (e.g., SXGA, UXGA, QSXGA, . . . NTSC, PAL, and SECAM), electrode spacing and size, use of transparent Indium Tin Oxide ("ITO") as the ground electrode 32, the magnitude and alternating sign of the applied potentials, and the gap dimension between the electrodes and the orientation layers are all suitable for the microfluidic structure 12. Thus, the invention can take advantage of existing active matrix LCD technology including fabrication techniques and animation software including commercially available video generation or editing software to develop a microfluidic platform 10 for controlling the motion of fluid droplets via electrowetting droplet control physics.

The array of drive electrodes 26 and/or ground electrode 32 is driven to manipulate samples or bodies of fluid 22a, 22b to perform chemical, biochemical, or cellular/biological assays. The fluids 22a, 22b may be in the form of electrolytic drops or droplets ranging in size from picoliters to microliter. The fluid quantities can be divided, combined, and directed to any location on the array 26. The motion of the fluid bodies 22a, 22b is initiated and controlled by electrowetting. This phenomenon is a result of the application of an electric potential between a body of fluid 22a, 22b such as a drop or droplet and a drive electrode 26 that is electrically insulated from the body of fluid 22a, 22b by a thin solid dielectric layer (illustrated in FIGS. 3–7). This locally changes the contact angle between the body of fluid 22a, 22b and the surface of the dielectric layer, resulting in a preferential application to one side of the fluid body 22a, 22b providing unbalanced forces parallel to the surface. The unbalanced forces result in motion of the fluid body 22a, 22b.

The use of electrodes 26, 32 and thin film technology to utilize electrowetting to arbitrarily manipulate bodies of fluid 22a, 22b is potentially revolutionary. The microfluidic structure 12 requires no moving parts while taking advantage of the most dominant forces that exist at the small scales: capillary forces. Microfluidic devices designed to utilize a continuous volume of liquid can be disrupted by the presence of bubbles in microchannels (e.g., use of syringe pumps or other positive displacement pumps). In contrast, the use of interfacial surface tension is consistent with the typical assay requirement that discrete fluid samples be delivered, mixed, reacted, and detected.

Figure 2:
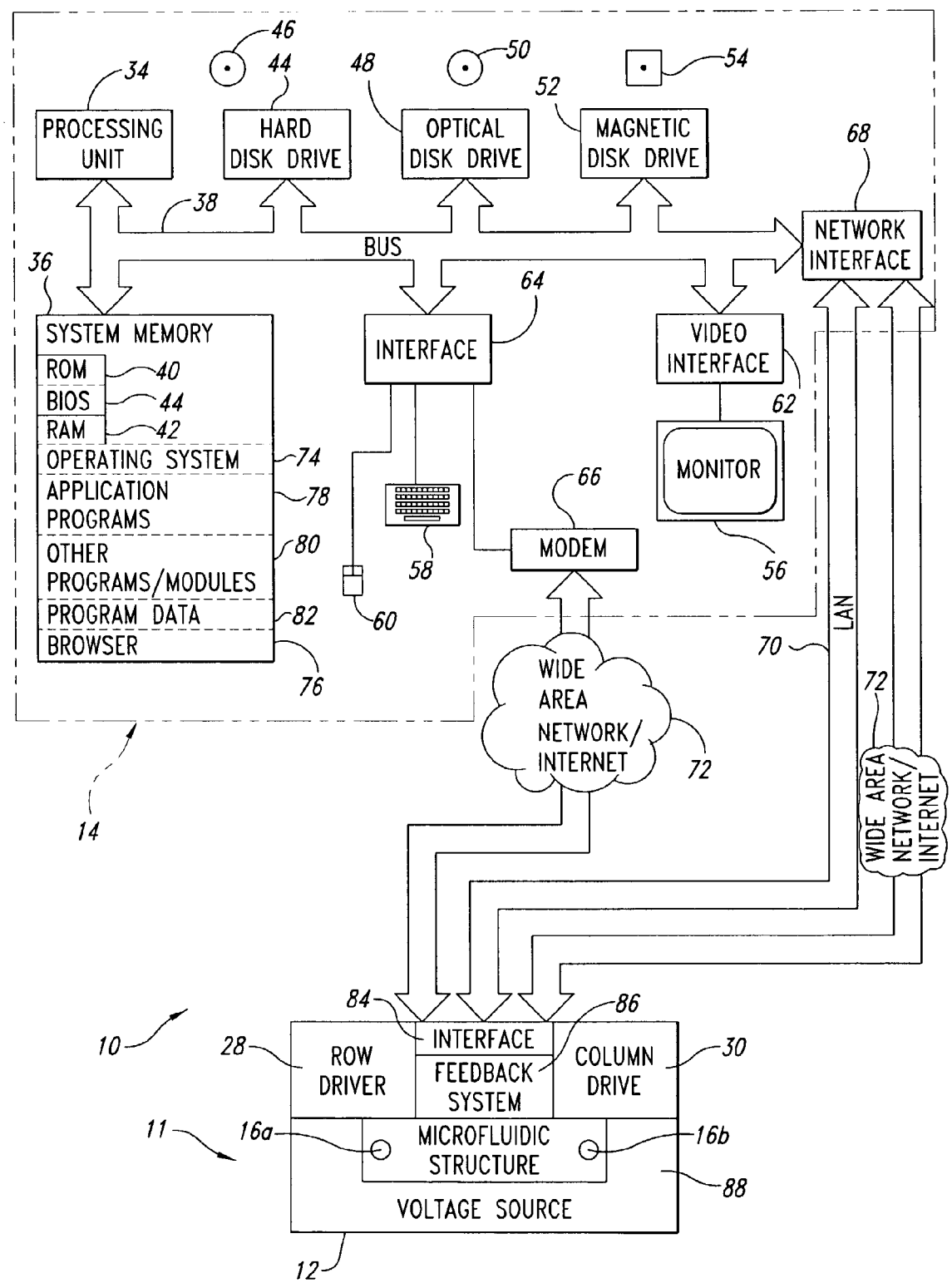
FIG. 2 is a schematic diagram of the computing system and microfluidic platform of FIG. 1.

FIG. 2 is a detailed view of one illustrated embodiment of the microfluidic system 10.

The computing system 14 includes a number of subsystems, such as a processor 34, system memory 36, system bus architecture represented by arrows 38 coupling the various subsystems. The system memory 36 may include read only memory ("ROM") 40, and/or random access memory ("RAM") 42 or other dynamic storage that temporarily stores instructions and data for execution by the processor 36.

The computing system 14 typically includes one or more computer-readable media drives for reading and/or writing to computer-readable media. For example, a hard disk drive 44 for reading a hard disk 46, an optical disk drive 48 for reading optical disks such as CD-ROMs or DVDs 50 and/or a magnetic disk drive 52 for reading magnetic disks such as floppy disks 54.

The computing system 14 includes a number of user interface devices, such as an active matrix display 56, keyboard 58 and mouse 60. A display adapter or video interface 62 may couple the active matrix display 56 to the system bus 38. An interface 64 may couple the keyboard 58 and mouse to the system bus 38. The mouse 60 can have one or more user selectable buttons for interacting with a graphical user interface ("GUI") displayed on the screen of the active matrix display 56. The computing system 14 may include additional user interface devices such as a sound card (not shown) and speakers (not shown).

The computing system 14 may further include one or more communications interfaces. For example, a modem 66 and/or network interface 68 for providing bi-directional communications over local area networks ("LAN") 70 and/or wide area networks (WAN) 72, such extranets, intranets, or the Internet, or via any other communications channels.

The computing system 14 can take any of a variety of forms, such as a micro- or personal computer, a minicomputer, a workstation, or a palm-top or hand-held computing appliance. The processor 34 can take the form of any suitable microprocessor, for example, a Pentium II, Pentium IV, Pentium IV, AMD Athlon, Power PC 603 or Power PC 604 processor. The computing system 14 is illustrative of the numerous computing systems suitable for use with the present invention. Other suitable configurations of computing systems will be readily apparent to one of ordinary skill in the art. Other configurations can include additional subsystems, or fewer subsystems, as is suitable for the particular application. For example, a suitable computing system 14 can include more than one processor 34 (i.e., a multiprocessor system) and/or a cache memory. The arrows 38 are illustrative of any interconnection scheme serving to link the subsystems. Other suitable interconnection schemes will be readily apparent to one skilled in the art. For example, a local bus could be utilized to connect the processor 34 to the system memory 36 and the display adapter 62.

The system memory 36 of the computing system 14 contains instructions and data for execution by the processor 34 for implementing the illustrated embodiments. For example, the system memory 36 includes an operating system ("OS") 74 to provide instructions and data for operating the computing systems 14. The OS 74 can take the form of conventional operating systems, such as WINDOWS 95, WINDOWS 98, WINDOWS NT 4.0 and/or WINDOWS 2000, available from Microsoft Corporation of Redmond, Wash. The OS 74 can include application programming interfaces ("APIs") (not shown) for interfacing with the various subsystems and peripheral components of the computing system 14, as is conventional in the art. For example, the OS 74 can include APIs (not shown) for interfacing with the active matrix display 56, keyboard 58, windowing, sound, and communications subsystems.

The system memory 36 of the computing system 14 can also include additional communications or networking software (not shown) for wired and/or wireless communications on networks, such as LAN 70, WAN or the Internet 72. For example, the computing system 14 can include a Web client or browser 76 for communicating across the World Wide Web portion of the Internet 72 using standard protocol (e.g., Transmission Control Protocol/Internet Protocol (TCP/IP), User Datagram Protocol (UDP)). A number of Web browsers are commercially available, such as NETSCAPE NAVIGATOR from America Online, and INTERNET EXPLORER available from Microsoft of Redmond, Wash.

The system memory 36 of the computing system 14 may also include instructions and/or data in the form of application programs 78, other programs and modules 80 and program data 82 for operation of the microfluidic platform and providing information therefrom, as discussed in detail below. The instructions may be preloaded in the system memory 36, for example in ROM 40, or may be loaded from other computer readable media 46, 50, 54 via one of the media drives 44, 48, 52.

Also as illustrated, the microfluidic platform 10 includes an interface 84 for providing communications between the computing system 14 and the various subsystems of the microfluidic platform such as a feedback subsystem 86, row driver 28 and column driver 30. The microfluidic platform also includes one or more voltage sources 88 for providing a potential to the drive electrodes 26 and/or ground electrode 32 in accordance with drive instructions supplied to the row and column drivers 28, 30 by the computing system 14. While shown as part of the microfluidic structure 12, in some embodiments the voltage source 88 may be a discrete component, electrically couplable to the microfluidic platform 10 and/or microfluidic structure 12.

Figure 3:
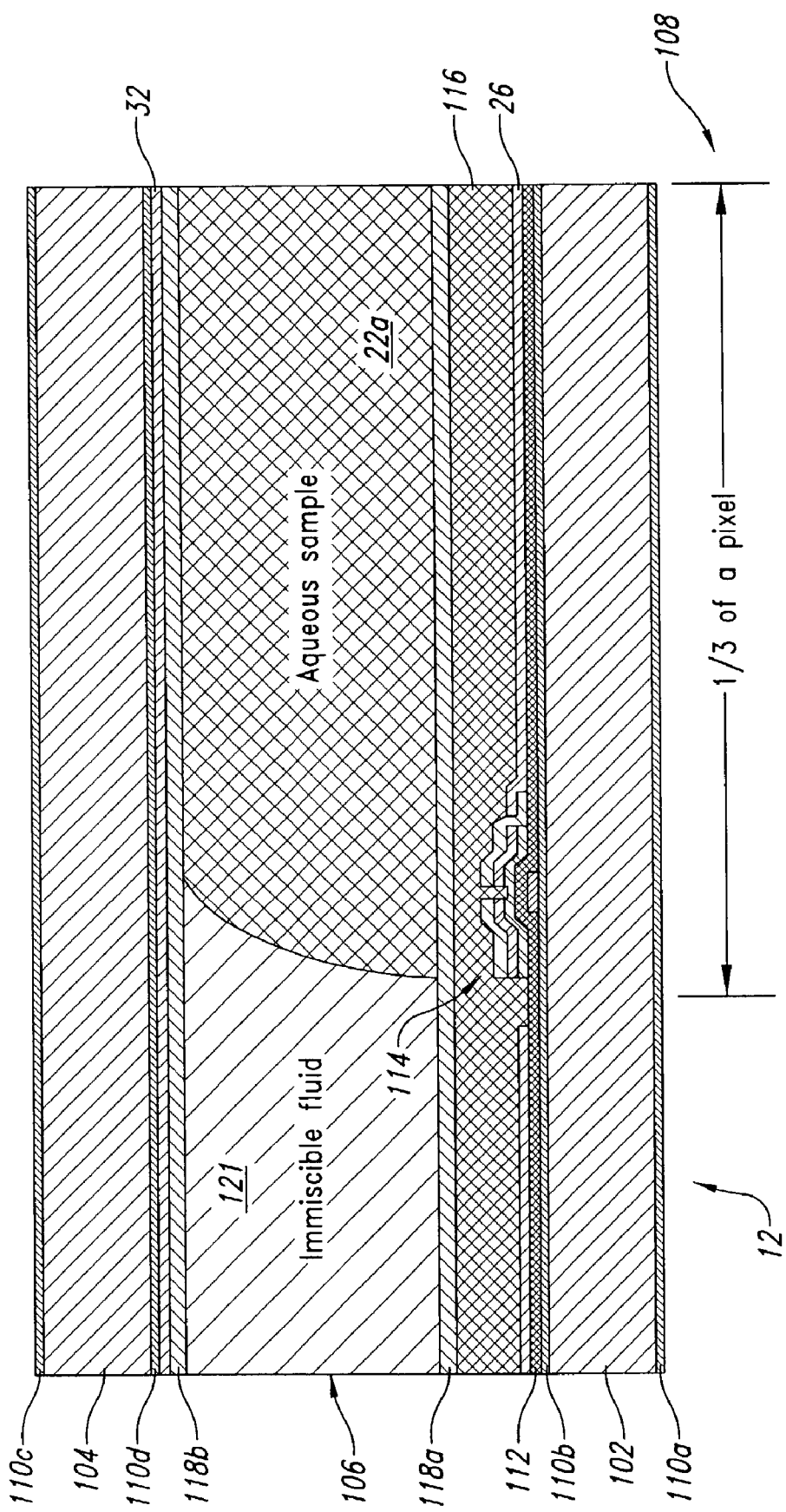
FIG. 3 is a cross-sectional view of one illustrated embodiment of a microfluidic structure.

FIG. 3 shows a cross-section of a portion of the microfluidic structure 12 corresponding to a single addressable element (i.e., pixel).

The microfluidic structure 12 includes first and second substrates 102, 104, spaced apart to form an interior or cavity 106 therebetween, and an exterior 108 thereout. The substrates 102, 104 may take the form of glass plates, and may include a sodium barrier film 110a–110d, on opposed surfaces of the respective substrates plates. The sodium barrier film may be applied to the substrate via sintering or via atmospheric pressure chemical vapor disposition ("APCVD") for example using a Sierra Therm 5500 series APCVD system.

A gate insulator 112 may be formed overlying the sodium barrier 110b on the interior surface of the first substrate 102. The array of drive electrodes 26 are formed on the gate insulator layer 112. The drive electrodes 26 may be transparent, for example being formed of transparent ITO. An array of transistors 114 (only one illustrated in FIG. 3) may also be formed on the gate insulator layer 112. The transistors 114 are electrically coupled to respective ones of the drive electrodes 26 for controlling the same. The transistors 114 may be thin film transistors formed via well-known thin film fabrication processes. A dielectric layer 116 is formed over the drive electrodes 26 and the transistors 114 to provide appropriate dielectric capacitance between the drive electrodes 26 and the bodies of fluid 22a, 22b. The dielectric layer 116 should be sufficiently thin to provide proper capacitance, yet not have pin holes which could cause electrical shorting.

One or more ground electrodes 32 may overlay the second glass substrate 104, for example, being formed over the sodium barrier film 110d on the interior surface of the second substrate 104. The ground electrode 32 may be transparent, for example, being formed of transparent ITO. This allows visual inspection of the microfluidic operation, which may be advantageously used with at least one embodiment of the feedback subsystem 86, as is discussed in detail below.

The microfluidic structure 12 may include at least one fluid compatibility layer 118 forming at least a portion of the cavity 106. The fluid compatibility layer 118 is formed of a fluid compatibility material, that is a material having appropriate physico-chemical properties for the fluid or assay of interest. For example, the selected fluid compatibility material should have appropriate hydrophobicity or hydrophylicity to prevent the chemical solutions from reacting with the fluid compatibility layer 118. From this perspective, it is unlikely that the use of polyimide coatings that are used in LCD systems will be useful for assays of interest. A Teflon or other hydrophobic coating will likely be required. The fluid compatibility material may be spaced from the electrodes 26, 32 by one or more intervening layers, such as the fluid compatibility layer 118a spaced from the drive electrodes 26 by the dielectric layer 116. Alternatively, the electrodes 26, 32 may be directly coated with the fluid compatibility material, such as the fluid compatibility layer 118b directly coating the ground electrode 32 in FIG. 3. In a further alternative, the microfluidic structure 12 may omit the fluid compatibility layer 118a, where the dielectric layer 116 has suitable fluid compatibility characteristics, such as hydrophylicity.

In the manufacture of LCD displays, the TFT/electrode plate and the ITO/color filter plate are epoxy bonded with spacers. A vacuum is used to fill the gap with the liquid crystal material and an epoxy plug seals the liquid crystal material from the surroundings. As discussed above, the microfluidic structure 12 includes a number of fluid inlet and outlet ports 16a, 16b, respectively (FIG. 1), which may be inserted at the edges of the substrates during the bonding step. A number of port designs may be used, and may include distinct or integrally formed values 24a, 24b such as a septum, capillary, or other valve to control flow of fluids 22a, 22b through the ports 16a, 16b after completion of the manufacturing process, for example, before or during use by the end user. The microfluidic structure 12 may also contain an immiscible fluid 121, for example air or some other immiscible fluid. The microfluidic structure 12 may also incorporate humidity control since small bodies of fluids (i.e., droplets) 22a, 22b will rapidly evaporate if conditions near saturation are not used. Alternatively, or additionally, rather than carefully controlling humidity, another fluid 121 may be used in lieu of air to prevent evaporation.

Thus, the principle modifications to an LCD design to achieve a microfluidic structure 12 involves (1) the omission of the liquid crystal material that normally resides in displays; (2) placement of appropriate layers to provide dielectric capacitance, chemical protection and hydrophobicity for the samples of interest, in lieu of the polyimide orientation layers used for displays; (3) placement of a protective overcoat immediately above the transparent ITO electrode with no other color filters or polarizing films required; and/or (4) the inclusion of one or more ports and/or values to permit placement and or removal of individual bodies of fluid 22a, 22b surrounded by air or other immiscible fluid into the region where the liquid crystal material normally resides in displays.

Figure 4:
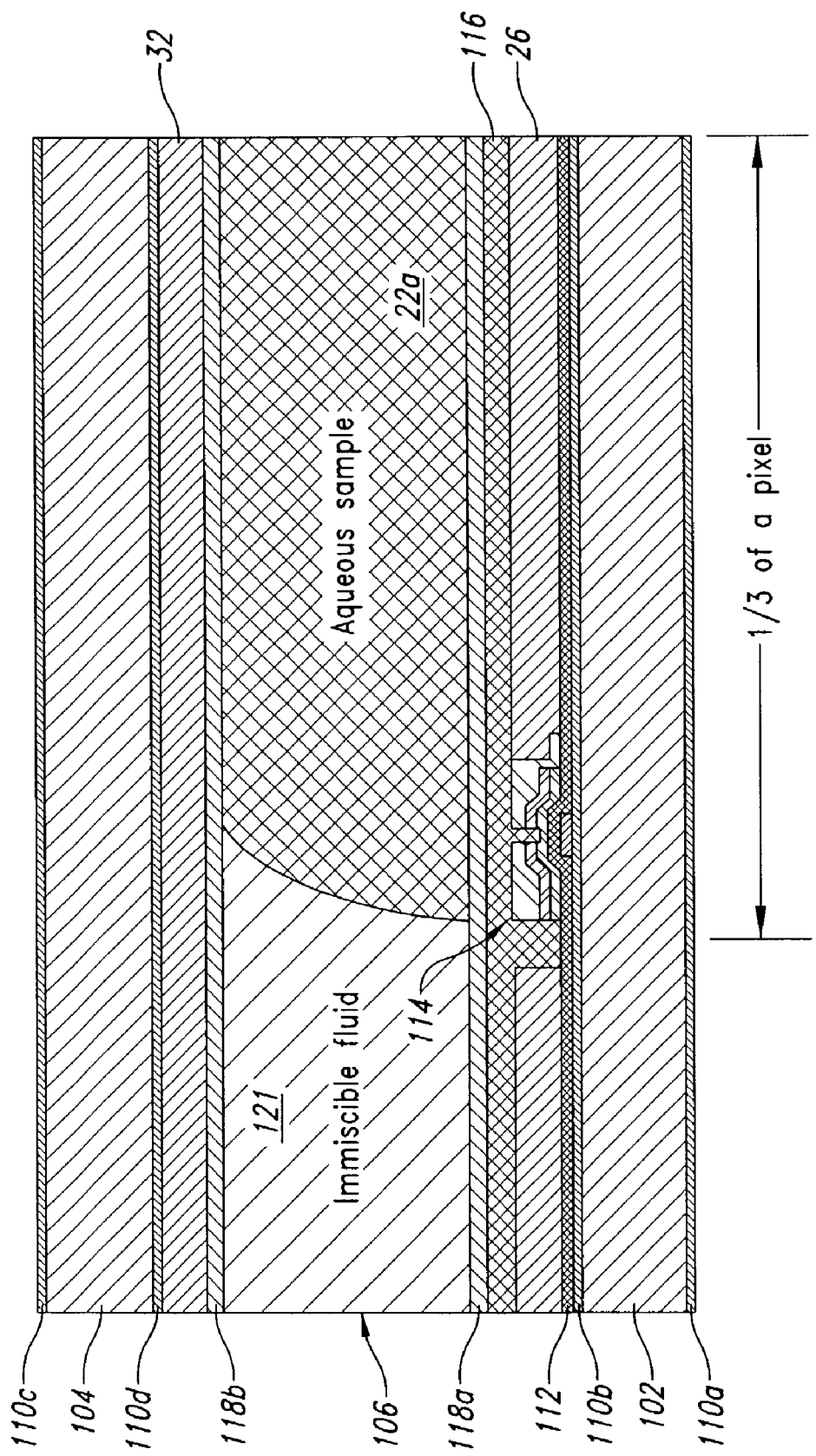
FIG. 4 is a first alternative illustrated embodiment of the microfluidic structure, having transistors formed in a plane of the drive electrodes.

FIG. 4 shows a first alternative embodiment of the microfluidic structure 12, where the transistor is formed within the plane of the drive electrode 26, and the dielectric layer 116 is thinner than the dielectric layer 116 illustrated in FIG. 3. Thus, where the embodiment of FIG. 3 has a different electrowetting force at the transistor 114 than at the drive electrode 26 spaced from the transistor 114, the embodiment of FIG. 4 is capable of a more uniform electrowetting force. The thinner dielectric layer 116 provides for a larger change in the contact angle, allowing easier movement of the bodies of fluid 22a, 22b. While other permutations are possible, it is desirable to maintain a substantially flat surface 118a to avoid adversely impacting fluid motion.

Figure 5:
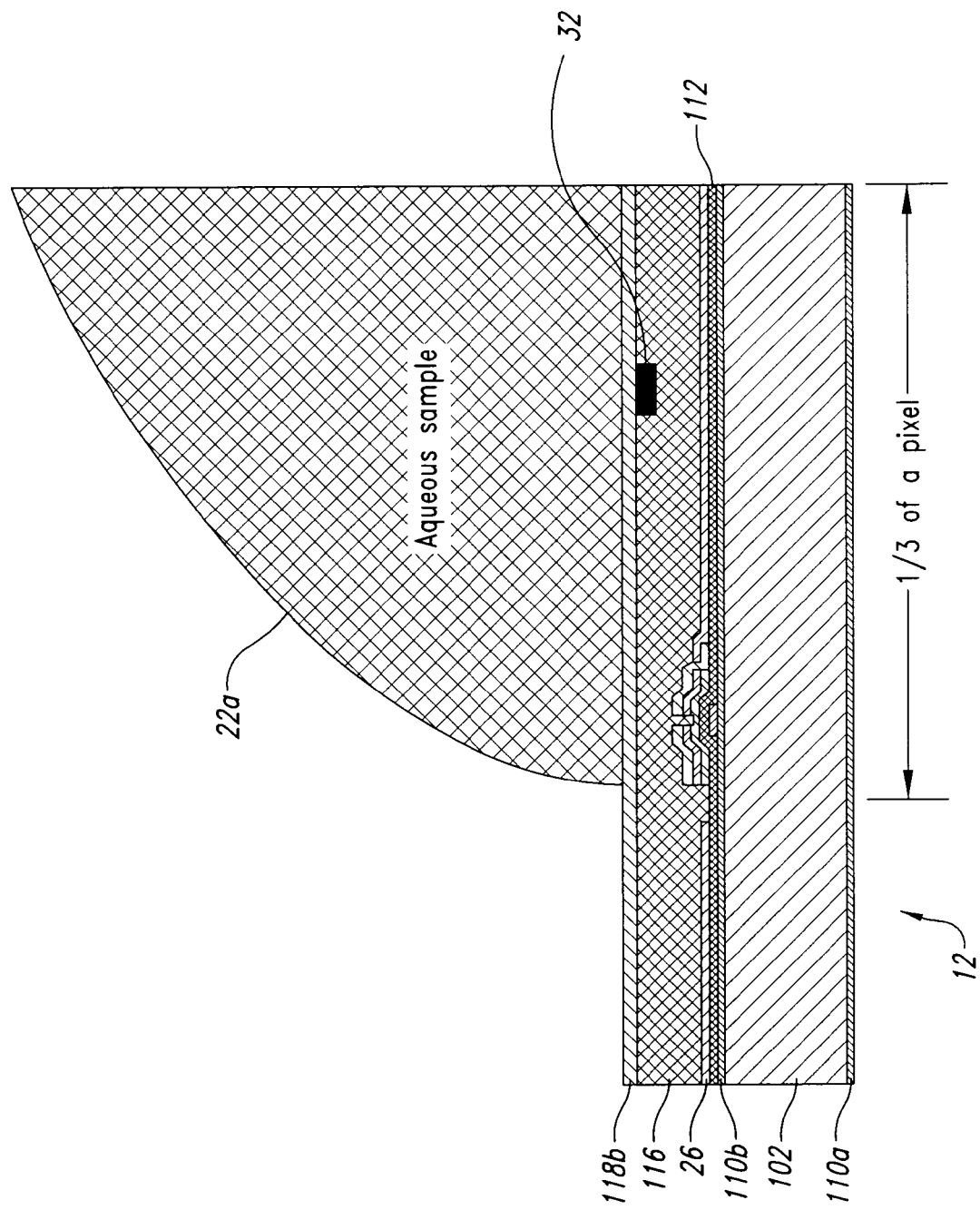
FIG. 5 is a second alternative illustrated embodiment of the microfluidic structure, omitting a substrate and ground electrode.

FIG. 5 shows a second alternative embodiment, of the microfluidic structure 12 omitting the ground electrode 32, as well as the second plate 104 and associated sodium barrier films 110c, 110d. Omission of the second plate 104, ground electrode 32 and associated barrier films 110c, 110d allows the microfluidic structure 12 to mate with existing robotic, ink-jet printer, and DNA micro-array printing technologies. Special attention to avoid rapid evaporation may be required in the embodiment of FIG. 5. The bodies of fluid 22a, 22b may be grounded via contact with a ground line 32 carried by the substrate 102, or the potentials of the bodies of fluid 22a, 22b may be allowed to float. In such a case, any leakage across the dielectric 116 will be averaged to ground where the drive voltage alternates polarity.

Figure 6:
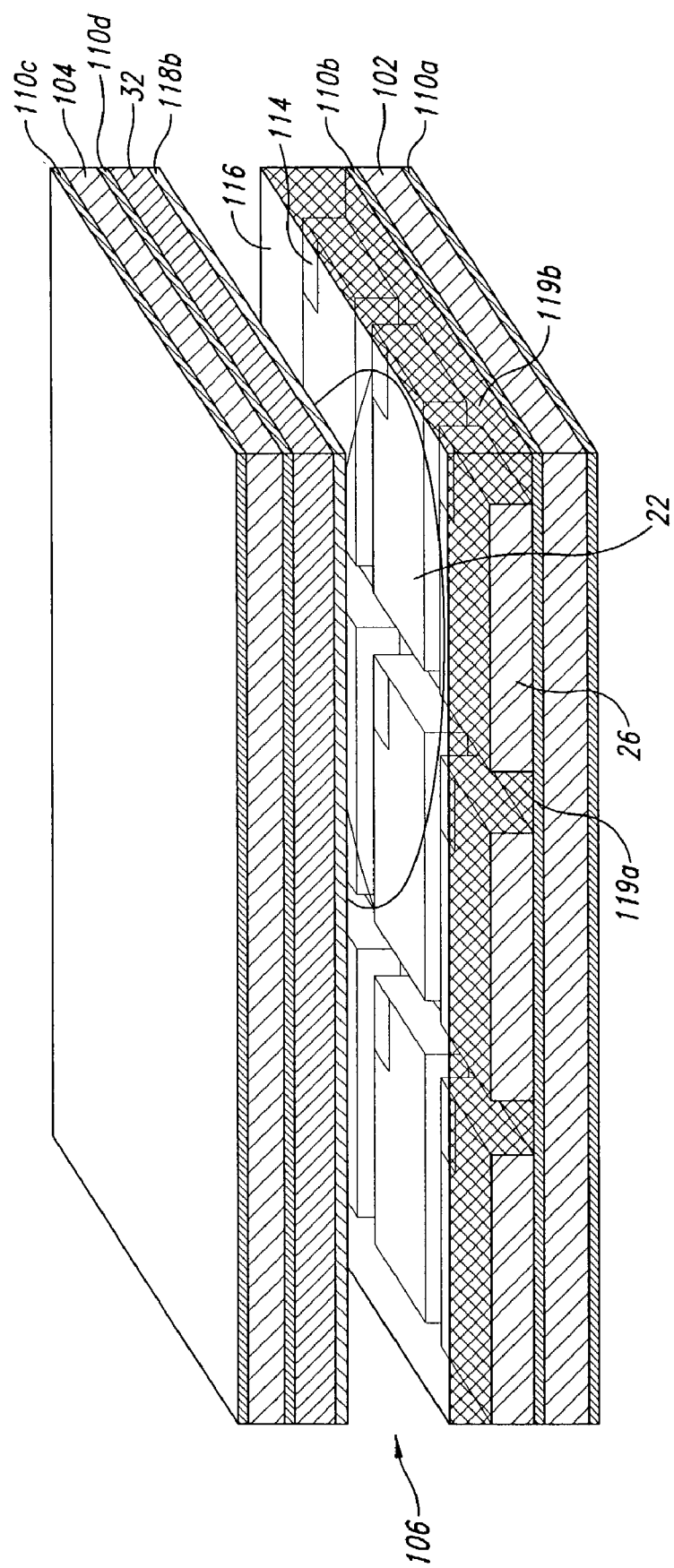
FIG. 6 is an isometric view of the microfluidic structure, illustrating the two-dimensional matrix array of electrodes, the array of transistors electrically coupled to respective ones of the electrodes, and the gate and source lines for driving the transistors.
Figure 7:
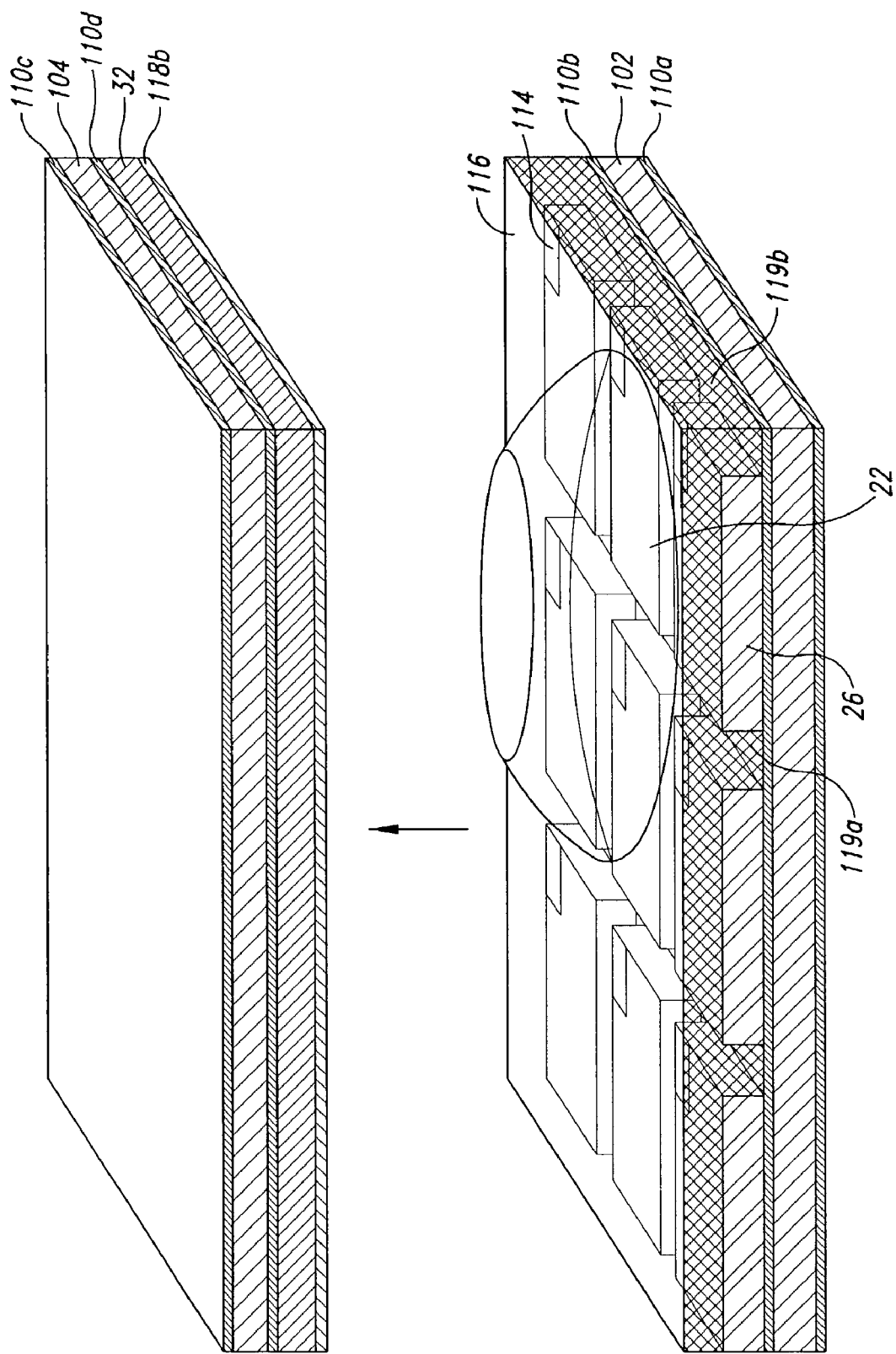
FIG. 7 is an isometric view of the microfluidic structure of FIG. 6, having the second plate raised to more fully illustrate the geometry of one of the bodies of fluid received in the cavity or interior of the microfluidic structure.

FIGS. 6 and 7 show the arrangement of drive electrodes 26 and TFT transistors 114 in the microfluidic structure 12, as well as, a number of gate lines 119a and source lines 119b (i.e., rows and columns lines) coupled to the gates and sources (not illustrated in FIGS. 6 and 7) of respective ones of the transistors 114. The fluid compatibility layer 118a has been omitted from FIGS. 5 and 6 for clarity of illustration. FIG. 7 also illustrates the geometry of a fluid body 22 received in the cavity between the fluid compatibility layers 118a, 118b overlying the substrates 102,104, respectively. The fluid bodies 22a, 22b may be moved along a flow path by varying the respective potential applied to different portions of the dielectric layer 116 overlying respective ones of the drive electrodes 26.

FIGS. 8A–8E illustrate an exemplary method of fabricating the microfluidic structure 12 of FIGS. 3–5, in sequential fashion. In the interest of brevity, a number of intervening depositioning. masking and etching steps to form the various layers and specific structures are not illustrated, but would be readily apparent to those skilled in the art of silicon chip fabrication and particularly the art of TFT fabrication.

Figure 8A:
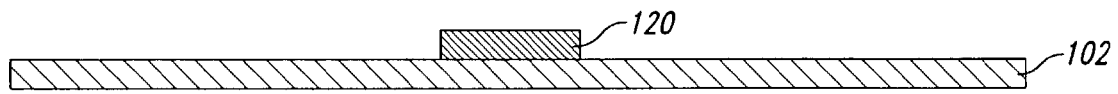
FIGS. 8A–8E are cross-sectional views of successive steps in fabricating the microfluidic structure.
Figure 8B:
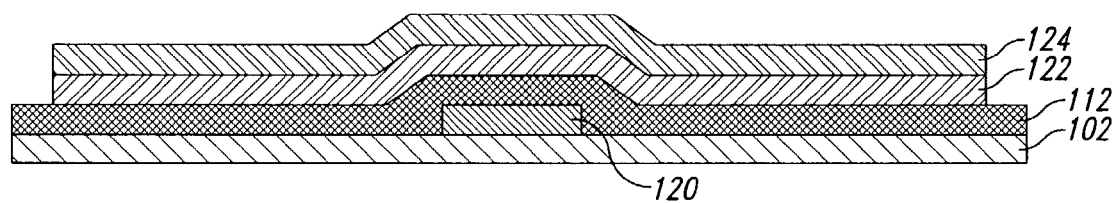
Figure 8C:
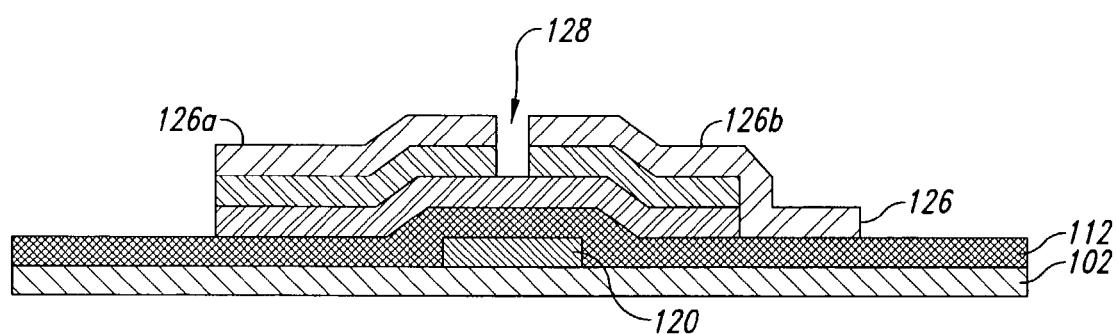
Figure 8D:
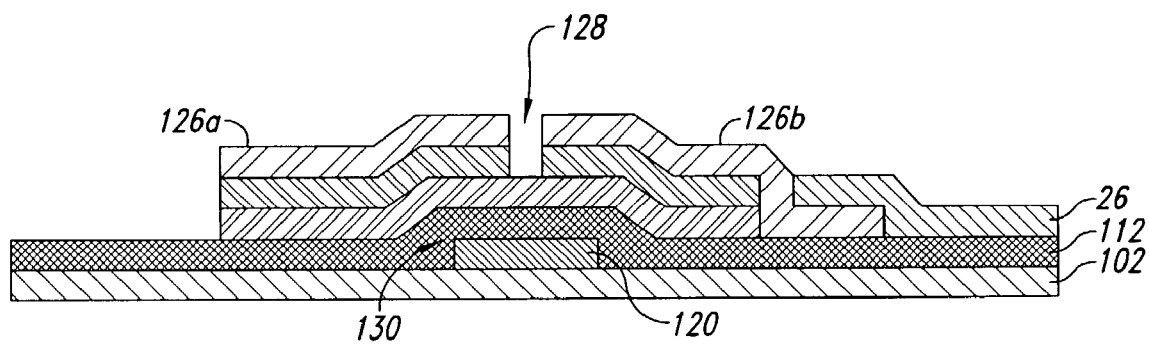
Figure 8E:
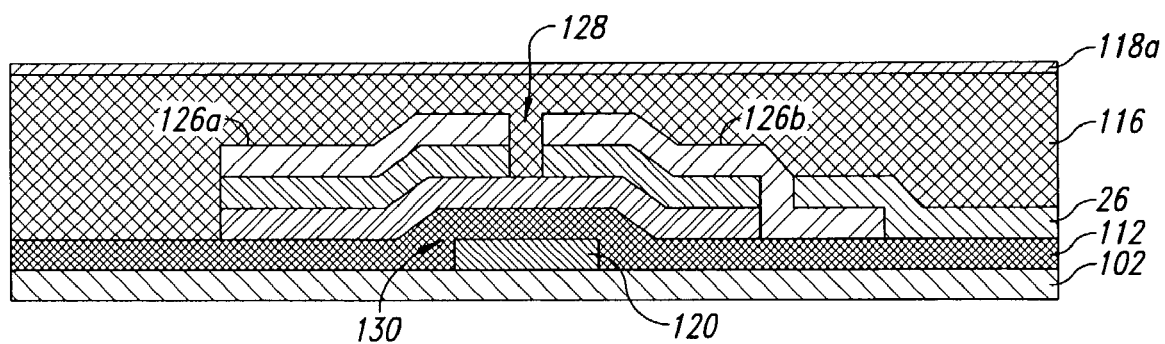

In particular, FIG. 8A shows a gate metal layer 120 on the glass substrate 102, after depositioning, masking and etching to form the gate of the transistor 114. The sodium barrier layer 110b is omitted from the illustration for clarity. FIG. 8B shows the deposition of the gate insulator layer 112, an amorphous silicon layer 122 and a positively doped amorphous silicon layer 124. FIG. 8C shows the deposition of the source/drain metal layer 126 for forming the source 126a and drain 126b of the transistor 114, and a trench 128 etched in the source/drain metal layer 122 and the doped amorphous silicon layer 124 over the gate metal layer 120 to form the gate 130. FIG. 8D shows the formation of the drive electrodes 26 which typically includes at least depositioning, masking and etching steps. FIG. 8E shows the formation of the dielectric layer 116 overlying the drive electrode array 26 and transistor array 114 and fluid compatible layer 118a overlying the dielectric layer 116.

Figure 9:
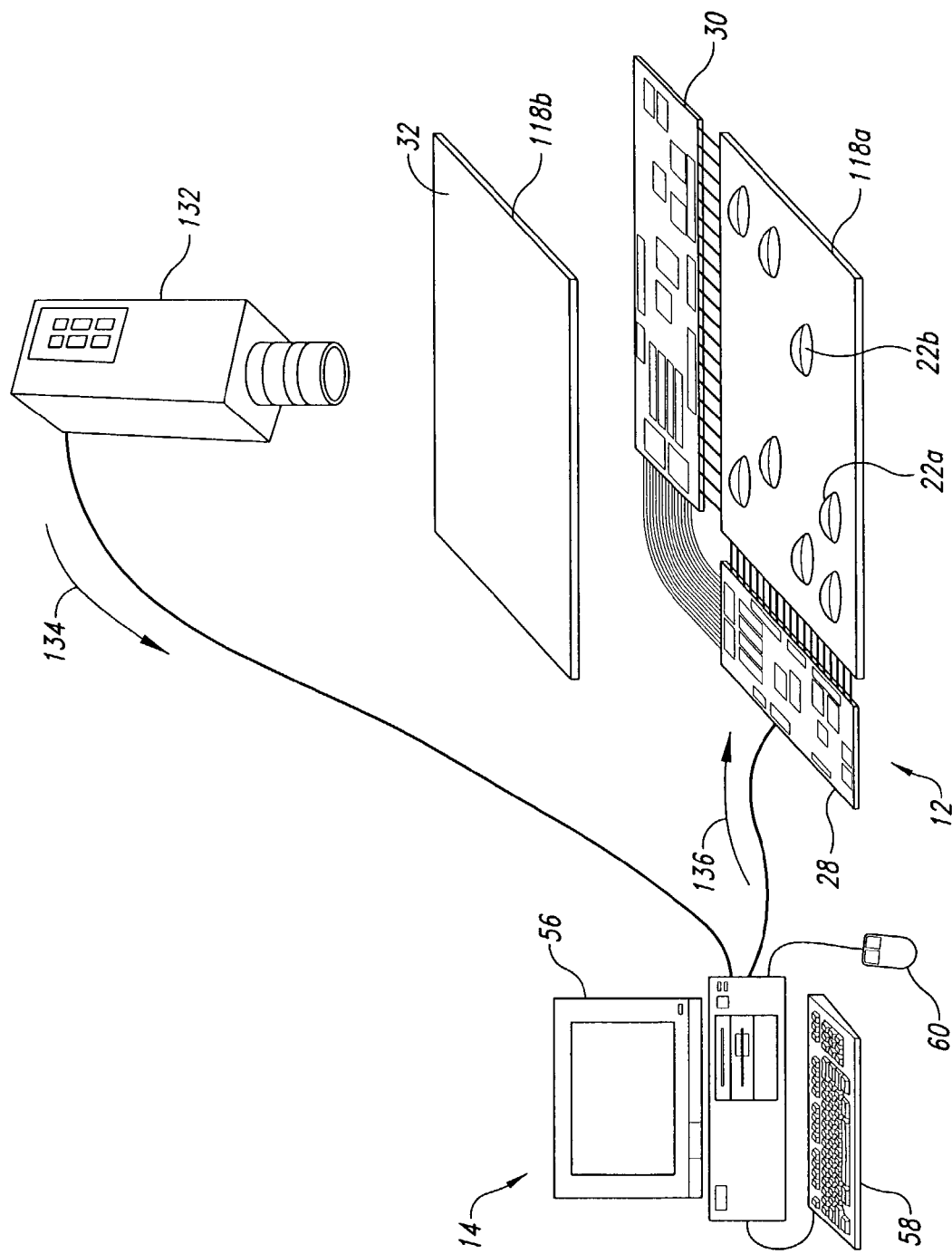
FIG. 9 is a schematic view of the microfluidic system illustrating one exemplary embodiment a feedback subsystem employing a set of visual sensors.

FIG. 9 illustrates a first embodiment of the feedback subsystem 86, employing a set of visual feedback sensors, for example, in the form of CCD sensor array or camera 132. The visual feedback sensors may take any of a variety of forms of photosensitive devices, including but not limited to one and two dimensional arrays of photosensitive sensors such as charge coupled devices ("CCDs"), Vidicon, Plumbicon, as well as, being configured to capture either still image or video image data.

The CCD sensor array or camera 132 is oriented to visual capture images of the through the transparent electrode 32. The image data 134 is supplied to the computing system 14 for analysis and/or display. The image date may be in suitable form for display on the active matrix display 56 without further processing. Thus, a live, or delayed, display of the actual movement of the bodies of fluid 22a, 22b may be provided. Suitable image processing software (e.g., application programs 78) may be loaded in the system memory 36 of the computing system 14 to process the image data (e.g., program data 86), and to identify a position of each body of fluid 22a, 22b in the microfluidic structure 12 at a series of time intervals. The position information may be processed to provide an animated display of the bodies of fluid 22a, 22b, and/or control the drive electrodes 26 of the microfluidic structure 12 via drive signals 136 as discussed more fully below.

Figure 10:
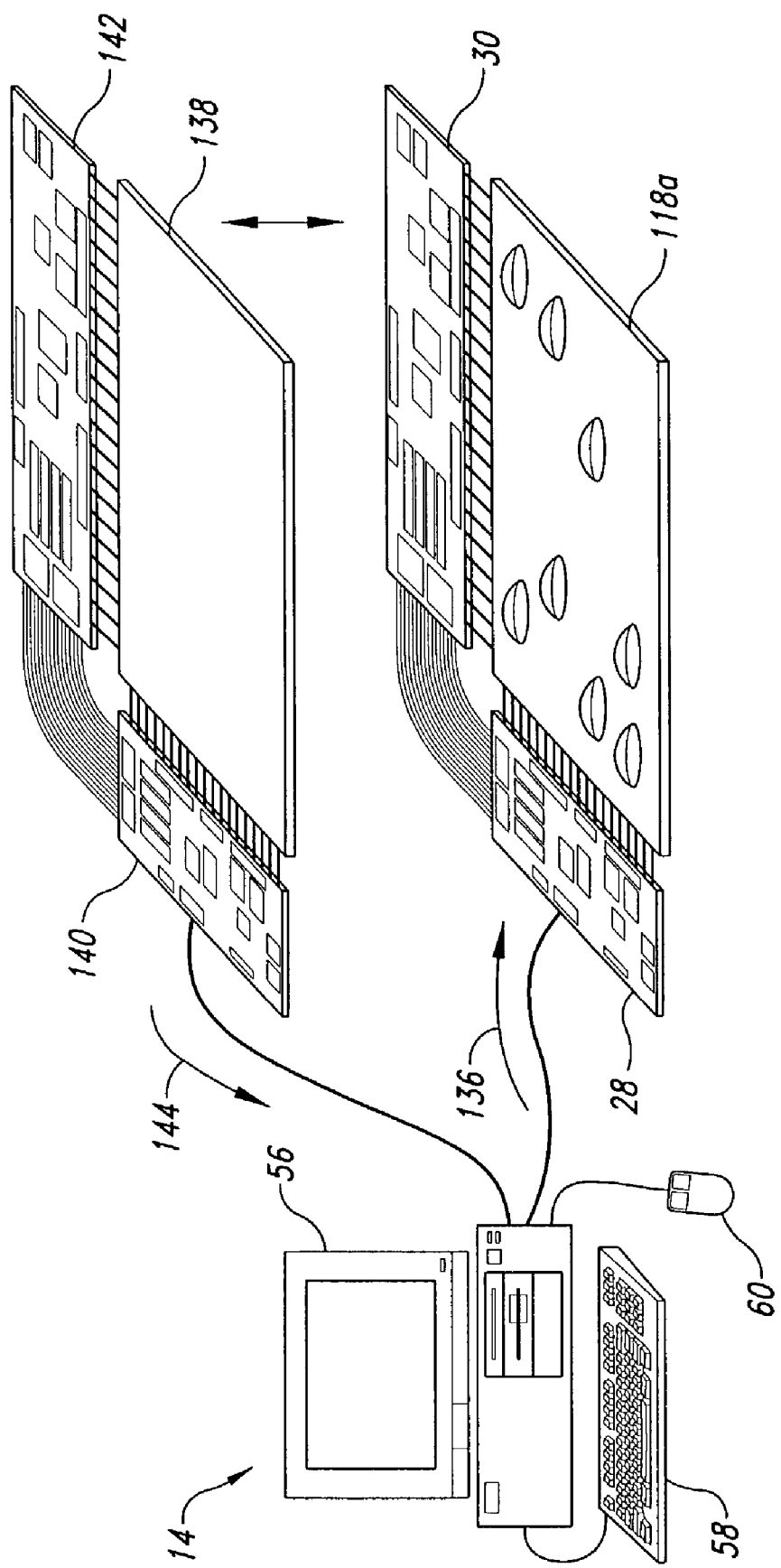
FIG. 10 is a schematic view of the microfluidic system illustrating another exemplary embodiment a feedback subsystem employing a set of capacitively or resistively sensitive sensors.

FIG. 10 illustrates a second embodiment of a feedback subsystem 86, employing a set of position detection sensors 138, and row and column detection circuitry 140,142, respectively. The position detection sensors 138 may be pressure sensitive, resistivity sensitive, or capacitivity sensitive.

One method of detecting the position of bodies of fluid 22a, 22b (e.g., drops or droplets) involves measuring the resistance between adjacent sensor electrodes. If the sensor electrodes are in electrical contact with the fluid body 22a, 22b, the application of a voltage pulse to one sensor electrode can be detected by an adjacent sensor electrode if the body of fluid 22a, 22b is in contact with both sensor electrodes. If the body of fluid 22a, 22b is not in contact with both sensor electrodes, the resistance of the air/immiscible fluid between the electrodes I too great for a pulse to be detected.

The feedback subsystem 86 may employ a TFT array of sensor electrodes by activating a row of sensor electrodes 140 and then pulsing the potential of one column of sensor electrodes 142 at a time, while measuring the potential at the adjacent sensor electrodes. By raster scanning through all rows and columns, data representing the location of bodies of fluid 22a, 22b can be provided to the active matrix display 56 to visually indicate the current location of the bodies of fluid 22a, 22b and/or to provide a feedback signal to control the drive electrodes 26 to adjust the motion of the bodies of fluid 22a, 22b. More generally, for any sensor system, the row and column detection circuitry 140, 142 receive electrical signals from the position detection sensors 138 and provide position information 144 to the computing system 14, identifying the position of one or more bodies of fluid 22a, 22b in the microfluidic structure 12. Suitable row and column detection circuitry 140, 142 is disclosed in U.S. Pat. No. 5,194,862 issued Mar. 16, 1993 to Edwards. Suitable processing software (e.g. application programs 78) may be loaded into the system memory 36 of the computing system 14 to provide an animated display of the bodies of fluid 22a, 22b, and/or control the drive electrodes 26 of the microfluidic structure 12 via drive signals 136 as discussed more fully below.

As an open platform, the microfluidic system 10 allows reconfiguration of protocols through the use of software to specify the potential of each electrode 26, 32, and thereby control the motion of individual bodies of fluid 22a, 22b. A protocol for a particular assay may be controlled by using commercial, off-the-shelf software, for example video editing software, to create an "animation" to charge the electrodes 26, 30 adjacent to a droplet edge sequentially so that motion occurs. Fluid bodies 22a, 22b with a lateral dimension (i.e., a dimension in the plane of the liquid/solid interface) allowing coverage of some portion of the dielectric layer 116 overlying at least two drive electrodes 26 can be moved by (1) addressing the electrodes with 8-bit control on the electrode potential that already exists in flat panel displays to provide 256 gray levels of light intensity and (2) addressing the display electrodes with control over the 3 display columns associated with Red, Green, and Blue for a display pixel so that microfluidic control can be provided with a factor of 3 increase over the display pixel density. (E.g., 1280×1024×3 for SXGA format).

The microfluidic structure 12 may employ TFT AMLCD technology and/or electrode addressing, and may thus use commercially available animation software (e.g., application programs 78). The use of an array of many drive electrodes 26 to control drops larger in diameter than one or two drive electrodes 26 has not been previously reported, while the microfluidic structure 12 may utilize multiple drive electrodes 26 to manipulate larger drops, for example causing a large drop to divide into two or more smaller drops. In particular, a ratio of at least two drive electrodes to an area covered by a fluid body 22a, 22b (i.e., electrowetted area) allows the splitting of the fluid body 22a, 22b into two fluid bodies. A ratio of at least three drive electrodes 26 to an area covered by a fluid body 22a, 22b allows particularly effective fine grain control of the fluid body 22a, 22b.

While commercial animation software may be used to generate protocols, this may in some cases require trial-and-error programs to ensure robust droplet control, especially for some droplet-splitting processes where surface tension forces marginally vary around the droplet edge. As discussed above, the feedback subsystem 86 may be integrated to detect the location of droplets, and to ensure robust droplet control, for example, via closed-loop feedback control. This will prove beneficial for users with samples having varying physical properties because a single control algorithm will not be appropriate for every sample. Customized software for generating animations within closed-loop feedback (i.e., real time control) to verify and direct droplet location may prove a major feature of the microfluidic system 10 platform as the system gains wide acceptance.

Figure 11:
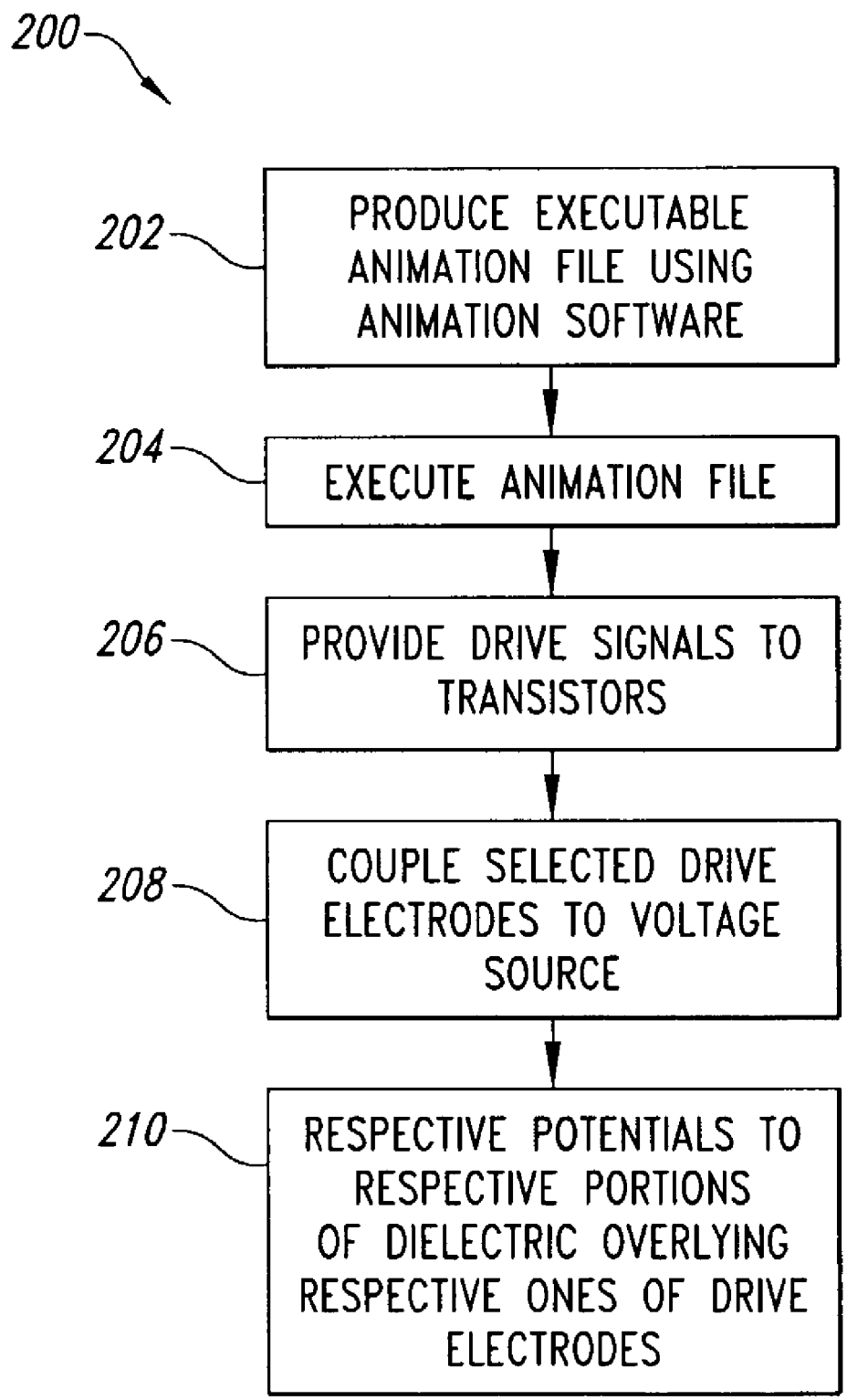
FIG. 11 is a flow diagram of one exemplary illustrated method of operating the microfluidic system, including producing an animation executable file using animation software.

FIG. 11 shows a method 200 of operating the microfluidic system 12. In act 202, an end user produces an executable animation file using the user interface of an animation software program or package. In some embodiments, the animation software may be standard, unmodified commercially available animation software suitable for producing animations or videos for display on active matrix displays. The animation software may stored on any computer-readable media 46, 50, 54 (FIG. 2) and may be executed on the computing system 14 (FIG. 1), or on some other computing system (not shown).

In act 204, the computing system 14 executes the animation file. In response, the computing system 14 provides drive signals to the transistors 114 (FIG. 3) by way of the row and column drivers 28, 30 (FIG. 1) in act 206. In act 208, the transistors 114 selectively couple the drive electrodes 26 to one or more voltage sources 88. In response, a respective potential is successively applied to respective portions of the dielectric layer 116, causing the fluid body 22a, 22b to move from drive electrode 26 to drive electrode 26, in act 210.

Figure 12:
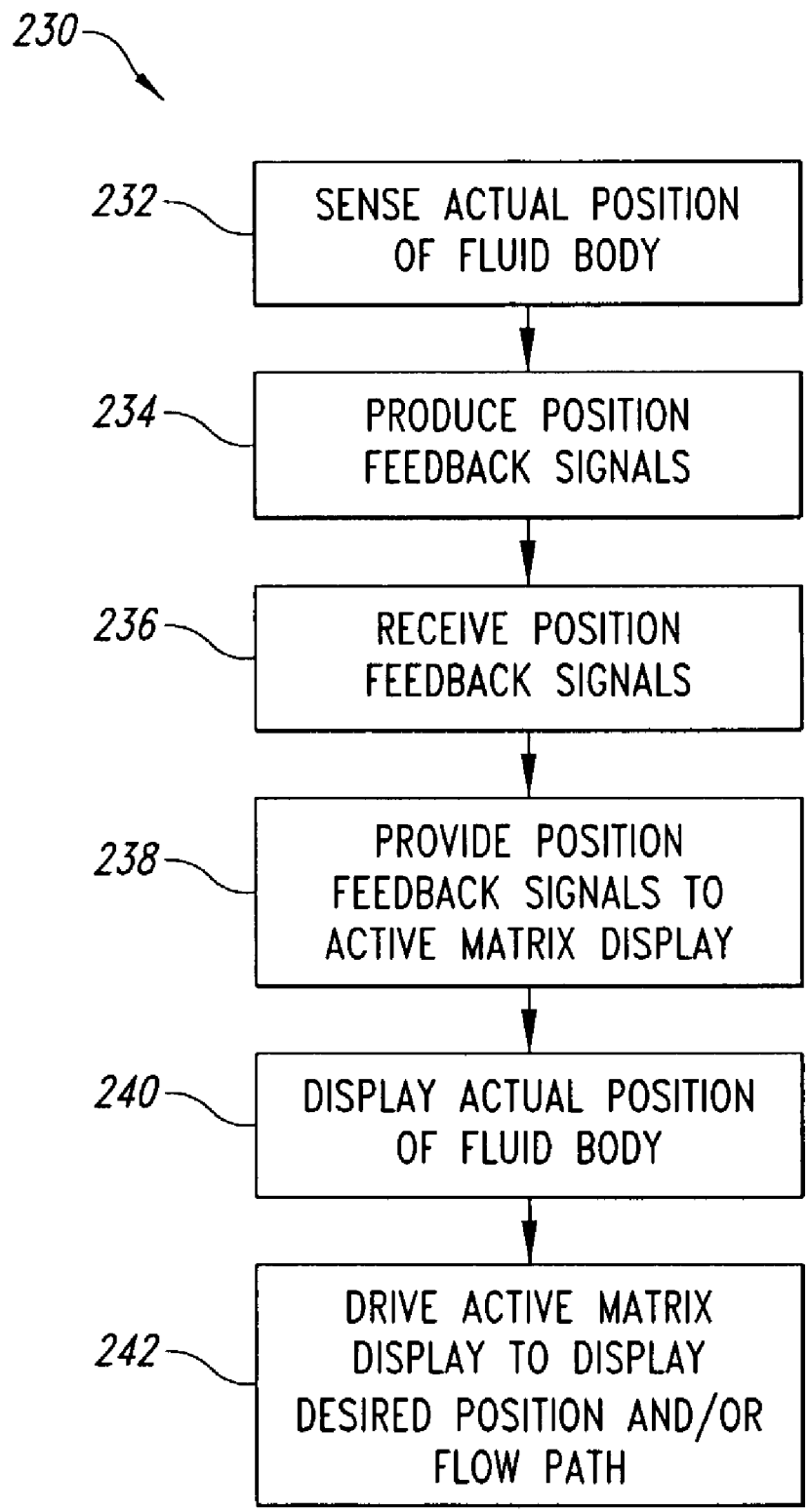
FIG. 12 is a flow diagram of an additional method of operating the microfluidic system including determining a position of a fluid body via the position feedback subsystem and displaying the actual position and/or flow path of the fluid body, and or a desired position and/or flow path of the fluid body.

FIG. 12 shows an additional method 230 of operating the microfluidic system 12. In act 232, the position feedback sensors sense the actual position of one or more bodies of fluid 22a, 22b. In act 234, the position feedback sensor produces position feedback signals. In act 236, the computing system 14 receives the position feedback signals. In act 238, the processing unit 34 of the computing system 14 provides position feedback signals to the active matrix display 56. In some embodiments, the position feedback signals require no modification or preprocessing to drive the active matrix display 56, for example, where the position feedback signals are provided by an active matrix of position detection sensors 138. In other embodiments, the position feedback signals may require preprocessing, for example, where the feedback signals a provided by an array of image sensors such as a camera 132. Act 240 can be performed in concert with act 242 to display the actual and desired locations and/or flow paths at the same time.

In act 240 the active matrix display 56 displays the actual position and/or flow path of one or more of the fluid bodies 22a, 22b. In act 242, the processing unit 34 of the computing system 14 drives the active matrix display 56 using the executable animation file to display a desired position and/or desired flow path of one or more bodies of fluid 22a, 22b. In some embodiments, the executable animation file requires no modification or preprocessing to drive the active matrix display 56, for example, where the executable animation file was generated with standard animation software.

Figure 13:
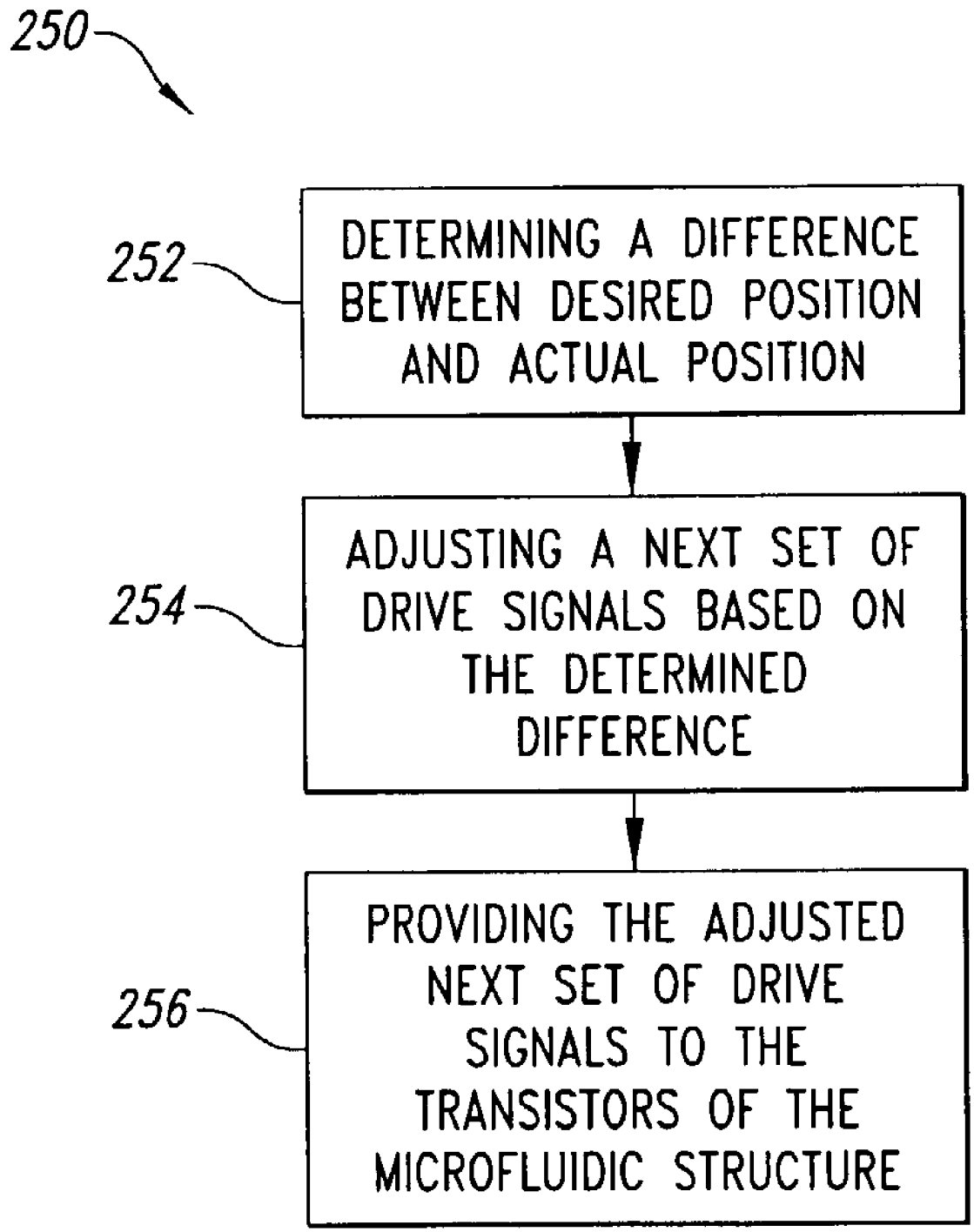
FIG. 13 is a flow diagram of a further method of operating the microfluidic system including employing the position feedback subsystem to adjust the operation of the microfluidic system based on position feedback.

FIG. 13 shows a further method 250 of operating the microfluidic system 12. In particular, the microfluidic system 10 employs the position feedback subsystem 86 to adjust the operation of the microfluidic system 10 based on position feedback. For example, in act 252, the computing system 14 determines a difference between an actual position and a desired position. In step 254 the computing system 14 adjusts a next set of drive signals based on the determined difference. For example, the computing system 14 may delay some signals, or change the frequency of electrode 26, 32 operation along one or more flow paths. In act 256, the computing system 14 provides the adjusted next set of drive signal to the transistors 114 to drive the drive electrodes 26, adjusting the movement of one or more of the bodies of fluid 22a, 22b from a previously defined flow path. Thus, the computing system 14 may compensate for inconsistencies in the physical structure of the microfluidic structure 12 (e.g., differences in drive electrodes 26, transistors 114, and/or across the fluid compatibility layer 118), and/or different properties of the fluid bodies 22a, 22b, and/or any other unexpected or difficult to estimate operating parameters.

Figure 14:
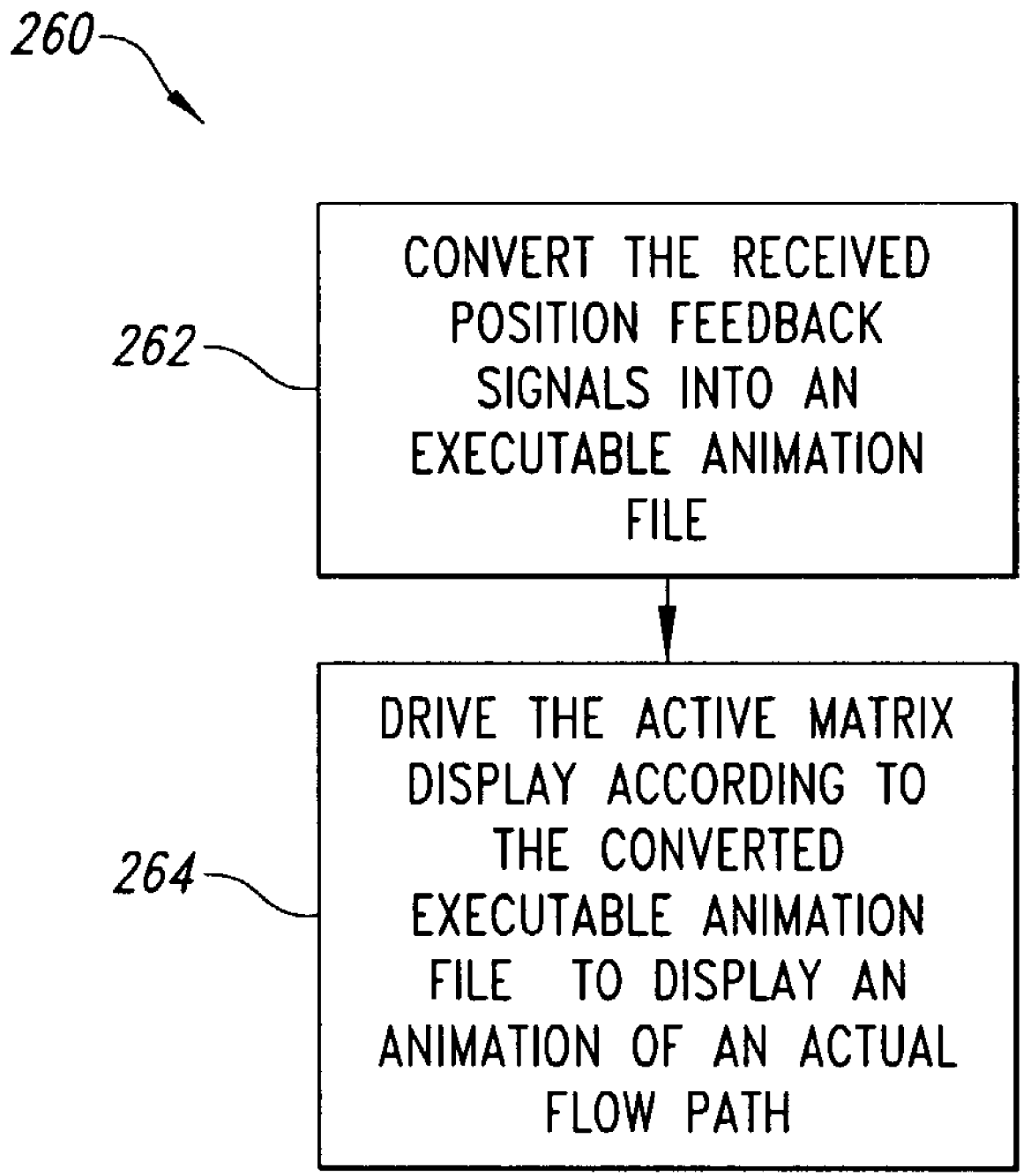
FIG. 14 is a flow diagram of an even further method of operating the microfluidic system including converting position feedback from the position feedback subsystem into an animation of an actual flow path.

FIG. 14 shows a further method 260 of operating the microfluidic system 12. In act 262, the computing system 14 converts the received position feedback signals into an executable animation file. In step 264, the processing unit 34 drives the active matrix display 56 according to the converted executable animation file to display an animation of the actual flow path of one or more of the bodies of fluid 22a, 22b.

The above-described methods can be used with each other, and the order of acts may be changed as would be apparent to one of skill in the art. For example, the method 260 can generate an animation of the actual flow path to be displayed in act 240 of method 230. Also for example, the method 250 can be combined with method 260 to display an adjusted position and/or flow path before providing the adjusted next set of drive signal to the transistors 114. The described methods can omit some acts, can add other acts, and can execute the acts in a different order than that illustrated, to achieve the advantages of the invention.

Figure 15:
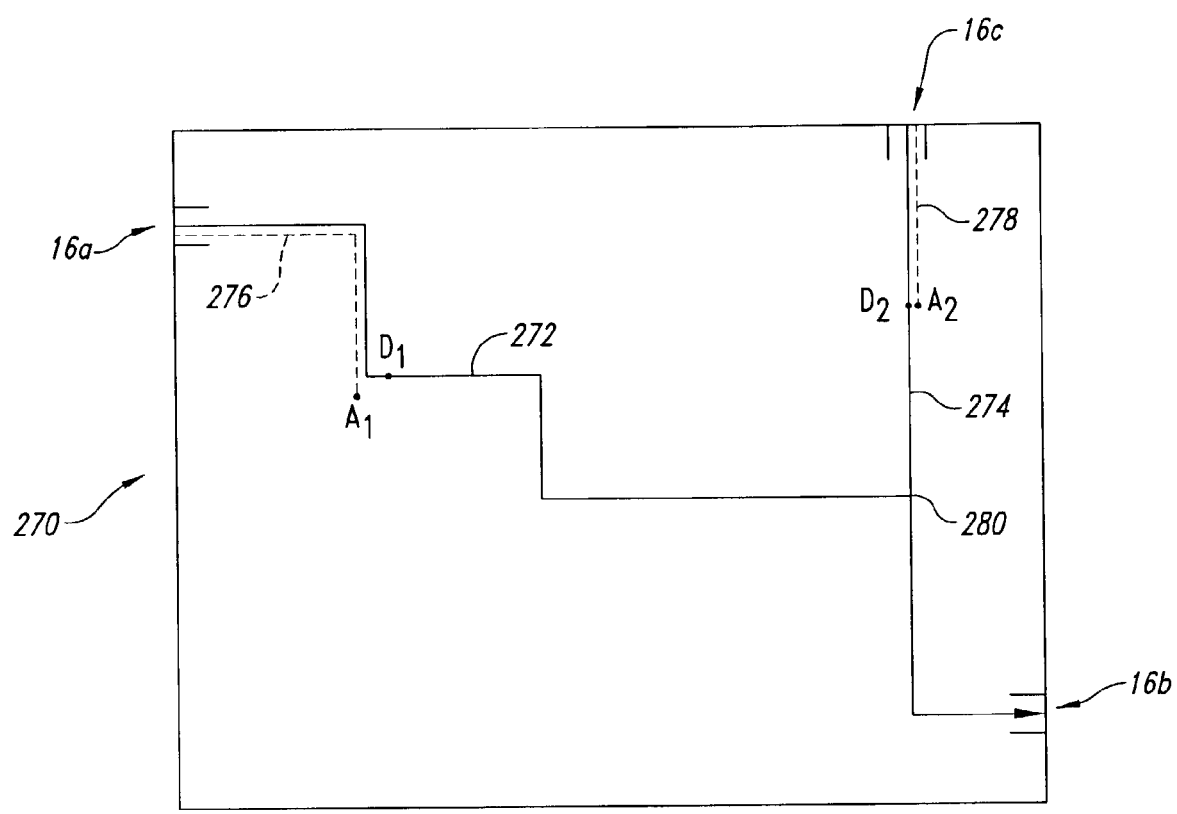
FIG. 15 is a schematic diagram of a screen display on an active matrix display of a set of desired flow paths, actual flow paths, desired positions and actual positions for a two bodies of fluid in the microfluidic structure.

FIG. 15 shows a display 270 on a screen of the active matrix display 56 (FIGS. 1 and 2) of a set of desired flow paths 272, 274, actual flow paths 276, 278, desired positions $D_1$, $D_2$ and actual positions $A_1$, $A_2$ for a two bodies of fluid 22a, 22b, respectively, in the microfluidic structure 12 in accordance with the methods discussed above. In particular, the body of fluid 22a enters via a first port 16a, and is directed along a desired flow path 272 to an exit port 16b. As illustrated by the actual flow path 276, the body of fluid 22a has deviated from the desired flow path 272 for any of a variety of reasons, and is at the actual position A1 instead of the desired position $D_1$ at a given time. The second fluid body 22b enters via a port 16c and is directed along a desired flow path 274, in order to combine with the first fluid body 22a at a point 280 . As illustrated by the actual flow path 278, the second fluid body 22b is following the desired flow path 274 as directed and the actual position $A_2$ corresponds with the desired position $D_2$. The computing system 14 can make appropriate adjustment in the drive signals to adjust the speed and/or direction of the first and/or second fluid bodies 22a, 22b to assure that the first and second fluid bodies 22a, 22b combine at the point 280, which may, or may not have an additional reactant or other molecular components.

Much of the detailed description provided herein is disclosed in the provisional patent application; most additional material will be recognized by those skilled in the relevant art as being inherent in the detailed description provided in such provisional patent application or well known to those skilled in the relevant art based on the detailed description provided in the provisional patent application. Those skilled in the relevant art can readily create source based on the detailed description provided herein.

Although specific embodiments of and examples for the microfluidic system and method of the invention are described herein for illustrative purposes, various equivalent modifications can be made without departing from the spirit and scope of the invention, as will be recognized by those skilled in the relevant art. The invention may utilize thin film transistor active matrix liquid crystal display technology to manipulate small samples of fluid for chemical, biochemical, or biological assays with no moving parts. The platform utilizes existing active matrix addressing schemes and commercial-off-the-shelf animation software such as video editing software to program assay protocols. The teachings provided herein of the invention can be applied to other microfluidic platforms, not necessarily the exemplary active matrix microfluidic platform generally described above. The various embodiments described above can be combined to provide further embodiments.

Other teachings on electrowetting include G. Beni and M. A. Tenan, "Dynamics of Electrowetting Displays," J. Appl. Phys., vol. 52, pp. 6011–6015 (1981); V. G. Chigrinov, *Liquid Crystal Devices, Physics and Applications*, Artech House, 1999; E. Lueder, *Liquid Crystal Displays, Addressing Schemes and Electro-Optical Effects*, John Wiley & Sons, 2001; M. G. Pollack, R B Fair, and A. Shenderov, "Electrowetting-based actuation of liquid droplets for microfluidic applications," Appl. Phys. Left., vol. 77, number 11, pp. 1725–1726 (2000); and P. Yeh and C. Gu, Optics of *Liquid Crystal Displays*, John Wiley & Sons, 1999.

All of the above U.S. patents, U.S. patent application publications, U.S. patent applications, foreign patents, foreign patent applications and non-patent publications referred to in this specification and/or listed in the Application Data Sheet, including but not limited to U.S. No. 60/333,621, filed Nov. 26, 2001, are incorporated herein by reference in their entirety.

Various changes can be made to the invention in light of the above-detailed description. In general, in the following claims, the terms used should not be construed to limit the invention to the specific embodiments disclosed in the specification and the claims, but should be construed to include all microfluidic platforms that operate in accordance with the claims. Accordingly, the invention is not limited by the disclosure, but instead its scope is to be determined entirely by the following claims.

The invention claimed is:

1. A microfluidic platform for moving microfluidic bodies having a lateral dimension, comprising:
   a plurality of drive electrodes having a dimension less than the lateral dimension of the microfluidic bodies;
   a dielectric layer overlying at least a portion of the plurality of electrodes;
   a plurality of thin film transistors coupled to the drive electrodes to control a respective potential to respective portions of the dielectric layer to move the fluidic bodies from a portion of the dielectric layer overlying one drive electrode to a portion of the dielectric layer overlying another drive electrode;
   at least one ground line overlying at least a portion of the dielectric layer to provide a ground potential to at least one microfluidic body; and
   a port providing fluid communications between an interior and an exterior of the microfluidic platform when the microfluidic platform is in use.

2. The microfluidic platform of claim 1 wherein the dimension of the electrodes is less than approximately half of the lateral dimension of the microfluidic bodies.

3. The microfluidic platform of claim 1 wherein the dimension of the electrodes is less than approximately one third of the lateral dimension of the microfluidic bodies.

4. The microfluidic platform of claim 1 wherein there are at least three drive electrodes in an area equivalent to an area that would be electrowetted by the fluid.

5. The microfluidic platform of claim 1, further comprising:
   a valve for selectively closing and opening the port when the microfluidic platform is in use.

6. A microfluidic system to move at least one fluid body, comprising:
   a substrate;
   an array of thin film transistors;
   an array of drive electrodes carried by the substrate;
   a dielectric carried by the substrate, overlying at least a portion of the array of drive electrodes;
   a fluid compatibility layer overlying the drive electrodes; and
   at least one ground line carried by the substrate, overlying at least a portion of the dielectric to provide a ground potential to at least one fluidic body.

7. The microfluidic system of claim 6, wherein the transistors of the array of thin film transistors are electrically coupled to respective ones of the drive electrodes in the array of drive electrodes to control a respective potential applied to respective portions of the dielectric overlying the drive electrodes to move the at least one fluidic body with respect to the drive electrodes.

8. The microfluidic system of claim 7, further comprising:
   a controller programmable to execute a set of driver instructions and coupled to control the transistors of the array of thin film transistors according to a set of driver instructions to supply at least one voltage from a voltage source to the drive electrodes via the transistors.

9. The microfluidic structure of claim 7 wherein the array of drive electrodes is a generally planar two-dimensional matrix, where successive drive electrodes in the array are activated to apply a different respective potential to the respective portions of the dielectric in a plane of travel of the at least one fluid body.

10. The microfluidic system of claim 6, further comprising:
    at least one voltage source for supplying at least one voltage.

11. The microfluidic system of claim 6, further comprising:
    a computing system; and
    a computer-readable medium having a set of computer animation instructions for causing the computing system to create the set of driver instructions in response to user input.

12. The microfluidic structure of claim 6 wherein each of the drive electrodes have a dimension less than a lateral dimension of the at least one fluid body.

13. The microfluidic structure of claim 6 wherein the fluid compatibility layer is hydrophobic.

14. The microfluidic structure of claim 6 wherein an interior microfluidic structure is open to an ambient environment in use.

15. The microfluidic structure of claim 6 wherein at least a portion of the dielectric is exposed to an exterior of microfluidic structure in use.

16. A method of forming a microfluidic structure for manipulating at least one fluid body, the method comprising:
    forming a substrate;
    forming a dielectric carried by the substrate;
    providing a first plate;
    forming an array of drive electrodes overlying at least a portion of the first plate, the drive electrodes having a dimension less than a lateral dimension of the at least one fluid body;
    forming an array of transistors overlying at least a portion of the first plate, the transistors electrically coupled to control the drive electrodes; and forming a fluid compatibility layer overlying the drive electrodes; and forming at least one ground line carried by the substrate and positioned to provide a ground potential to the at least one fluid body wherein the at least one ground line overlies at least a portion of the dielectric.

17. The method of claim 16 wherein forming an array of drive electrodes overlying at least a portion of the first plate includes forming a two-dimensional matrix array of electrodes, and wherein forming an array of transistors comprises forming a two-dimensional matrix array of thin film transistors electrically coupled to respective ones of the drive electrodes.

18. The method of claim 16 wherein forming a fluid compatibility layer overlying the array of drive electrodes comprises depositing a hydrophobic material over the array of drive electrodes, the fluid compatibility layer exposed to an exterior of the microfluidic structure during use.

19. The method of claim 16, further comprising:

forming a first fluid compatibility coating overlying the at least one ground line, the first fluid compatibility coating exposed to an exterior of the microfluidic structure during use.

* * * * *